(12) United States Patent
Sirainen

(10) Patent No.: US 9,628,428 B1
(45) Date of Patent: Apr. 18, 2017

(54) VIRTUAL EMAILS FOR IMAP COMMANDS

(71) Applicant: OX Software GmbH, Monheim (DE)

(72) Inventor: Timo Sirainen, Espoo (FI)

(73) Assignee: OX SOFTWARE GMBH, Monheim (DE)

( * ) Notice: Subject to any disclaimer, the term of this patent is extended or adjusted under 35 U.S.C. 154(b) by 0 days.

(21) Appl. No.: 15/201,581

(22) Filed: Jul. 4, 2016

(51) Int. Cl.
*H04L 12/58* (2006.01)
*H04L 29/06* (2006.01)

(52) U.S. Cl.
CPC ........ *H04L 51/28* (2013.01); *H04L 29/06027* (2013.01); *H04L 51/10* (2013.01); *H04L 51/22* (2013.01); *H04L 12/584* (2013.01); *H04L 12/5845* (2013.01)

(58) Field of Classification Search
CPC .............. H04L 12/584; H04L 12/5845; H04L 29/06027
See application file for complete search history.

(56) References Cited

U.S. PATENT DOCUMENTS

| | | | | |
|---|---|---|---|---|
| 6,735,770 | B1* | 5/2004 | Yeager | G06F 9/546 718/107 |
| 7,483,949 | B2* | 1/2009 | Pike | G06Q 10/107 709/204 |
| 9,070,115 | B2* | 6/2015 | Hitchcock | G06Q 10/107 |
| 9,258,144 | B2* | 2/2016 | Ramdas | H04L 12/584 |
| 2002/0112008 | A1* | 8/2002 | Christenson | H04L 51/30 709/206 |
| 2006/0218234 | A1* | 9/2006 | Deng | H04L 51/066 709/206 |
| 2006/0259556 | A1* | 11/2006 | Auhagen | G06Q 10/107 709/206 |
| 2007/0061402 | A1* | 3/2007 | Mehr | H04L 12/585 709/206 |
| 2010/0228827 | A1* | 9/2010 | Birkby | H04L 51/066 709/206 |
| 2011/0060801 | A1* | 3/2011 | Virk | H04L 12/587 709/206 |
| 2011/0185024 | A1* | 7/2011 | Ramarao | G06Q 10/107 709/206 |
| 2012/0317222 | A1* | 12/2012 | Almeida | G06Q 10/107 709/206 |
| 2013/0282850 | A1* | 10/2013 | Lu | H04M 3/4872 709/206 |
| 2014/0122620 | A1* | 5/2014 | Lin | G06Q 10/107 709/206 |

(Continued)

*Primary Examiner* — Lashonda Jacobs
(74) *Attorney, Agent, or Firm* — Maschoff Brennan

(57) ABSTRACT

Some embodiments provide a method to extract metadata of MIME attachments or other distinguishable MIME parts of MIME emails into virtual emails. The virtual emails do not contain the full MIME attachment data but instead include some or all header fields of the parent email which contains the MIME attachment and a link to the MIME part of the MIME attachment in this email. The virtual emails may be stored in a separate namespace, or a folder which may be hidden from some IMAP clients, on an IMAP server. The virtual emails may be indexed by the IMAP server like any other email. Virtual emails may be created when new emails arrive on the IMAP server and synchronized automatically, e.g., when the parent email changes. As such, standard IMAP commands like FETCH, SEARCH, SORT, THREAD, etc. may be used for virtual emails.

20 Claims, 5 Drawing Sheets

(56) References Cited

U.S. PATENT DOCUMENTS

2015/0121202 A1\* 4/2015 Saund .................. G06F 17/211
 715/249
2015/0121203 A1\* 4/2015 Saund .................. G06F 17/211
 715/249

\* cited by examiner

VIRTUAL EMAILS FOR IMAP COMMANDS

FIELD

Some embodiments described herein generally relate to the Internet Message Access Protocol (IMAP) protocol and more specifically to virtual emails for IMAP commands.

BACKGROUND

Unless otherwise indicated herein, the materials described herein are not prior art to the claims in the present application and are not admitted to be prior art by inclusion in this section.

Currently, IMAP servers store one email as one entity without considering any Multipurpose Internet Mail Extensions (MIME) parts in each email. There is no known mechanism provided to extract metadata of MIME parts of an email for further use in IMAP commands by the IMAP client. Therefore, MIME attachments, or other MIME parts of an email, cannot be searched, or listed by the IMAP client at the level of the MIME attachments or other MIME parts. Instead any SEARCH, SORT, or other IMAP commands are performed at the level of the emails. For example, a SEARCH can return a reply that, e.g., a given email matched a query, without specifying whether it was a message text body or an attachment of the email that specifically matched the query.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Some embodiments provide methods to extract the metadata of MIME parts of an email into a separate namespace, or a folder, which may normally be hidden from at least some IMAP clients, on an IMAP server for later use as separate virtual email without duplicating the payload of the MIME parts. Although the MIME parts themselves are not copied to the new namespace or folder, their corresponding virtual emails in the new namespace or folder may be indexed like any email by the IMAP server for further use in IMAP commands like SEARCH, FETCH, SORT, or THREAD for example.

In an example embodiment, a method to process multipart MIME messages may include receiving a multipart MIME message. The method may also include determining that the multipart MIME message includes a distinguishable MIME part. The method may also include processing the distinguishable MIME part, including generating a virtual email that represents the distinguishable MIME part. The method may also include adding the multipart MIME message and the virtual email to an electronic mailbox of a recipient of the multipart MIME message.

In another example embodiment, a non-transitory computer-readable medium having computer-readable instructions stored thereon that are executable by a processing device to perform or control performance of operations is described. The operations may include receiving a multipart MIME message. The operations may also include determining that the multipart MIME message includes a distinguishable MIME part. The operations may also include processing the distinguishable MIME part, including generating a virtual email that represents the distinguishable MIME part. The operations may also include adding the multipart MIME message and the virtual email to an electronic mailbox of a recipient of the multipart MIME message.

Additional features and advantages of the disclosure will be set forth in the description which follows, and in part will be obvious from the description, or may be learned by the practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth hereinafter.

BRIEF DESCRIPTION OF THE DRAWINGS

To further clarify the above and other advantages and features of the present disclosure, a more particular description of the disclosure will be rendered by reference to specific embodiments thereof which are illustrated in the appended drawings. It is appreciated that these drawings depict only typical embodiments of the disclosure and are therefore not to be considered limiting of its scope. The disclosure will be described and explained with additional specificity and detail through the use of the accompanying drawings in which.

DETAILED DESCRIPTION OF SOME EXAMPLE EMBODIMENTS

Figure 1:
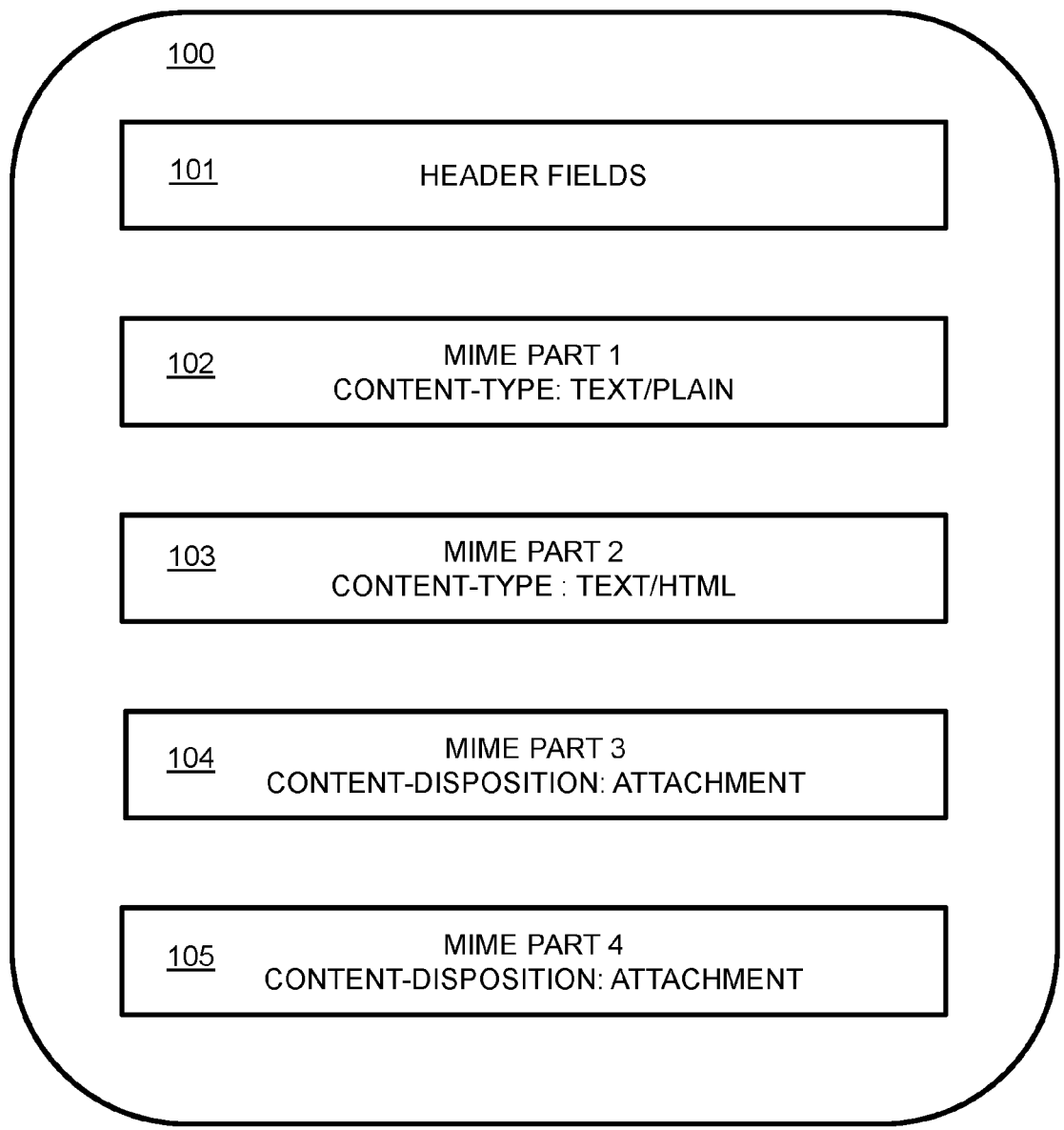
FIG. 1 depicts an example email implemented as a multipart MIME message.

Some embodiments described herein generally relate to the IMAP protocol and more specifically to virtual emails to represent MIME attachments for IMAP commands. Some embodiments described herein may involve extracting metadata of MIME attachments and/or other distinguishable MIME parts from multipart MIME messages.

In general, any MIME message, even if it contains multiple MIME parts, is considered as one entity from the perspective of an IMAP server. Therefore, it is not possible to process IMAP commands—such as SEARCH, FETCH, SORT, THREAD, for example—on the level of MIME attachments that may be included in possibly different MIME messages.

The structure of every MIME message is parsed by the IMAP server and can be queried from the IMAP client. When MIME attachments satisfy a given SEARCH query, the IMAP server may return the parent email (or a corresponding identifier) without specifying the specific MIME attachment that satisfies the query.

In comparison, some embodiments described herein identify all MIME attachments from received MIME messages and store each MIME attachment or other distinguishable MIME part as a virtual email, which makes it possible for the IMAP server to process MIME attachments like any other MIME message. For instance, at least some disclosed embodiments make it possible for the IMAP client to use any IMAP command (SEARCH, SORT, THREAD, FETCH for example) on the level of MIME attachments. Thus, if a MIME attachment matches a SEARCH query, the virtual email (or a corresponding identifier) that represents and specifically identifies the MIME attachment can be returned as opposed to (or in addition to) returning the parent email which may include multiple attachments and/or other MIME parts.

In these and other embodiments, the IMAP server generates virtual emails for some or all MIME attachments (or other distinguishable MIME parts) which are found in a multipart MIME message (such as an email with one or more attachments). Multipart MIME messages that include at least one MIME attachment or other distinguishable MIME part may be referred to as parent emails or simply emails in the discussion that follows. Each virtual email may include a copy of all mail header fields from a corresponding parent email, except the field subject. Instead, the field subject from the parent email may be copied to a new header field of the virtual email that may be referred to as "X-Original-Subject" and the field subject of the virtual email may be replaced by a filename of the corresponding MIME attachment. As mail body the virtual email contains a link or pointer to the MIME part in the parent email which contains the MIME attachment. The foregoing virtual email structure makes it possible to process the MIME attachment like a normal MIME message without duplicating the complete payload of the original MIME part.

The virtual emails may be stored in a separate namespace from a folder in which the corresponding parent emails are stored, or in an email folder which is normally not visible to the IMAP client.

The virtual emails can be indexed by the IMAP server like any other email and therefore can be searched or listed in the IMAP client by using standard IMAP commands. At least one virtual email may be created by the IMAP server every time a user receives a new email which contains at least one MIME attachment.

In some embodiments, any time the IMAP client opens the namespace or folder for virtual emails, the virtual emails may be synchronized with the underlying parent emails. Such synchronization may ensure that possible deletions or shifts of emails are reflected by later used IMAP commands.

Embodiments discussed herein are generally described as being implemented with the IMAP protocol. However, the disclosed embodiments may be adapted for implementation with virtually any other messaging protocol or messaging architecture.

Reference will now be made to the drawings to describe various aspects of some example embodiments of the invention. The drawings are diagrammatic and schematic representations of such example embodiments, and are not limiting of the present invention, nor are they necessarily drawn to scale.

FIG. 1 depicts an example email 100 implemented as a multipart MIME message, arranged in accordance with at least one embodiment described herein. The email 100 includes various header fields 101 and multiple distinguishable MIME parts 102-105. The header fields 101 may include one or more of a subject field, a sender field, a recipient field, a date field, or other email message fields.

Each of the MIME parts 102-105 may have its own header fields. In some embodiments, MIME part-specific header fields of CONTENT-TYPE and/or CONTENT-DISPOSITION may be used to identify MIME attachments for which virtual emails may be generated. As an example, MIME parts such as MIME parts 104 and 105 in FIG. 1 that have CONTENT-DISPOSITION that includes "attachment" may be identified as MIME attachments for which virtual emails may be generated, with some possible exceptions. For instance, MIME parts with both CONTENT-DISPOSITION that includes "attachment" and CONTENT-TYPE that includes "*-signature" (e.g., "pgp-signature", "pkcs7-signature", etc.) may be excluded from virtual email generation.

Figure 2:
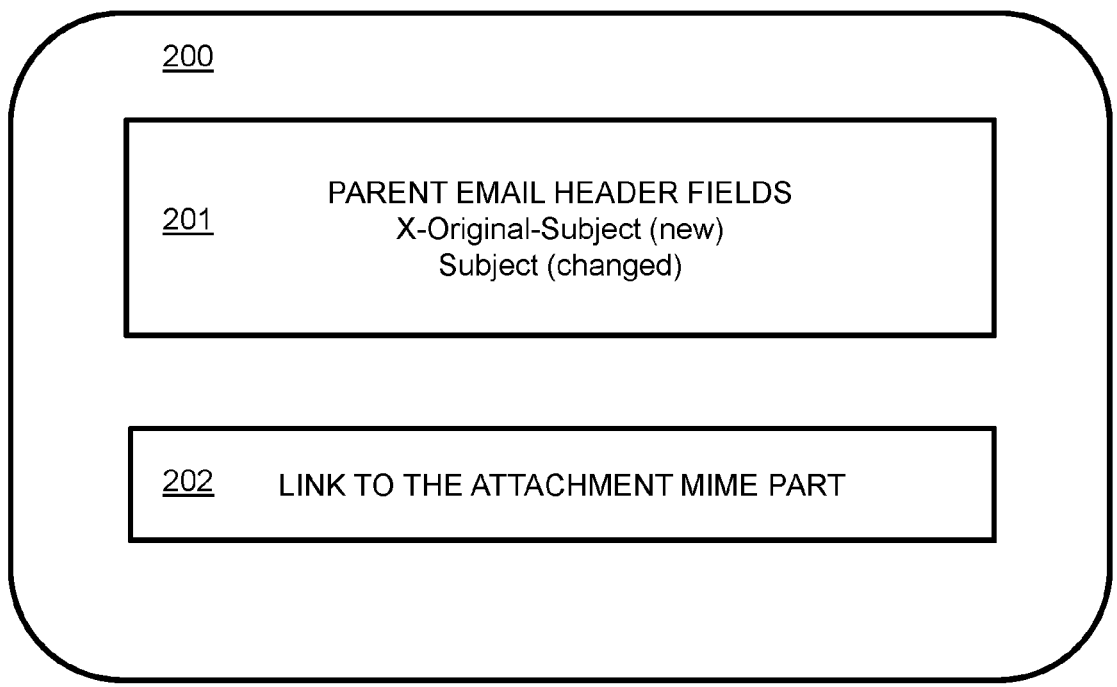
FIG. 2 is a block diagram of an example virtual email that may be generated for a distinguishable MIME part such as a MIME attachment.

FIG. 2 is a block diagram of an example virtual mail 200 that may be generated for a distinguishable MIME part (e.g., a MIME attachment) of a multipart MIME message (e.g., parent email), arranged in accordance with at least one embodiment. As an example, the virtual email 200 may be generated for the MIME part 104 or the MIME part 105 of the email 100 of FIG. 1. The virtual email 200 includes various header fields 201, including "PARENT EMAIL HEADER FIELDS," an "X-Original-Subject (new)" field, and a "Subject (changed)" field. The PARENT EMAIL HEADER FIELDS included in the header fields 201 may include all of the header fields of the parent email except for the subject field. For instance, the PARENT EMAIL HEADER FIELDS included in the header fields 201 may include all of the header fields 101 of the parent email 100 of FIG. 1 except for the subject field. The X-Original Subject (new) field included in the header fields 201 may include the same content as the subject field of the parent email. For instance, he X-Original Subject (new) field included in the header fields 201 may include the same content as the subject field included in the header fields 101 of the parent email 100 of FIG. 1. The Subject (changed) field included in the header fields 201 may include a filename of the MIME attachment for which the virtual email 200 is generated. For instance, the Subject (changed) field included in the header fields 201 may include a filename of the MIME part 104 or the MIME part 105 of the email 100 of FIG. 1.

The virtual email 200 additionally includes a mail body 202. In some embodiments, the mail body 202 includes a link to the MIME attachment or other distinguishable MIME part of the corresponding parent email. For instance, where the virtual email 200 is generated for the MIME part 104 or the MIME part 105 of the email 100 of FIG. 1, the mail body 202 of the virtual email 200 may include a link to the MIME part 104 or the MIME part 105 in the email 100.

Figure 3:
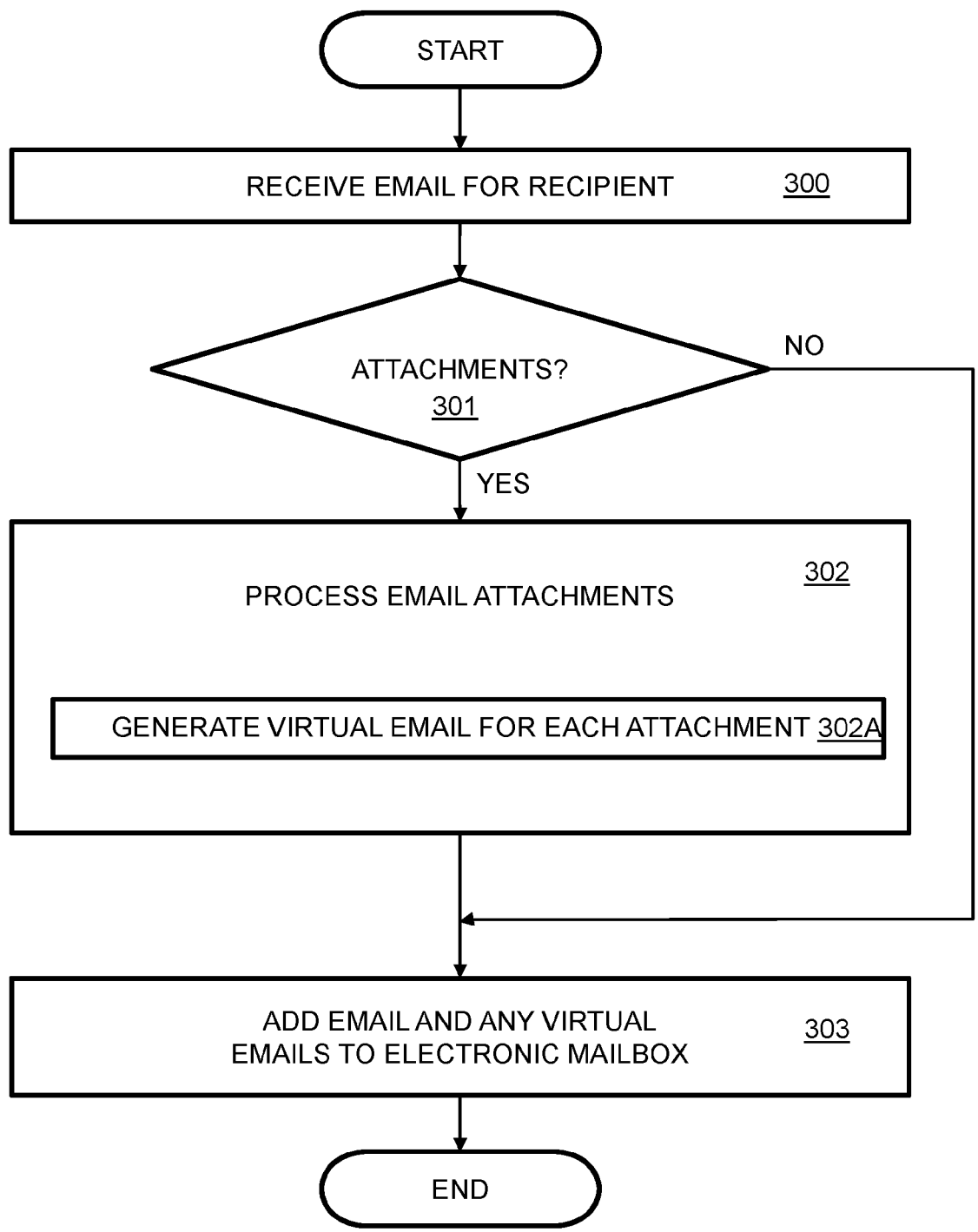
FIG. 3 is a flowchart of an example method to process MIME messages.

FIG. 3 is a flowchart of an example method to process MIME messages, arranged in accordance with at least one embodiment described herein. The method of FIG. 3 may be programmably performed or controlled by a processor in, e.g., a computer or server that includes an IMAP server. An example computing device that may correspond to the foregoing computer or server and that includes one or more processors that may perform or control performance of the method of FIG. 3 is described below with respect to FIG. 5. The method of FIG. 3 may begin at block 300.

At block 300 ("RECEIVE EMAIL FOR RECIPIENT"), an email (or more generally a multipart MIME message)

may be received for a recipient, e.g., at or by an IMAP server that hosts an electronic mailbox of the recipient. The recipient may be designated as the recipient in a header field of the multipart MIME message. The email may include the email 100 of FIG. 1, for example. The recipient may also be referred to as a user and may operate a client device that runs an IMAP client to communicate with the IMAP server over a network to, e.g., access the electronic mailbox of the user that includes emails of the user. The user's/recipient's electronic mailbox may include multiple folders to organize the user's email messages, such as an inbox folder for received emails, a sent folder for sent emails, a draft folder for drafted and unsent emails, a deleted folder for deleted emails, and/or other folders. Block 300 may be followed by block 301.

At block 301 ("ATTACHMENTS?"), it may be determined whether the email includes any attachments for which to generate virtual emails. More generally, it may be determined whether the email includes any distinguishable MIME parts such as MIME attachments for which to generate virtual emails. Determining whether the email includes any distinguishable MIME parts such as MIME attachments for which to generate virtual emails may include parsing the email into multiple MIME parts and/or analyzing the CONTENT-DISPOSITION and/or CONTENT-TYPE of each of the distinguishable MIME parts. For instance, it may be determined that a given distinguishable MIME part is one for which a virtual email will be generated if the given distinguishable MIME part has a CONTENT-DISPOSITION that includes "attachment" and/or if the CONTENT-DISPOSITION has a parameter "filename". Alternatively or additionally, it may be determined that a given distinguishable MIME part is one for which a virtual email will be generated if the given distinguishable MIME part has a CONTENT-DISPOSITION that includes "attachment" and a CONTENT-TYPE that does not include "-signature". The foregoing are examples and other algorithms may be implemented in other embodiments to determine whether emails include distinguishable MIME parts. Block 301 may be followed by block 302 ("YES" at block 301) or by block 303 ("NO" at block 301).

At block 302 ("PROCESS EMAIL ATTACHMENTS"), the distinguishable MIME parts determined to be present at block 301 may be processed to generate corresponding virtual emails. For instance, for each distinguishable MIME part determined at block 301, the distinguishable MIME part may be processed to generate a virtual email that represents and/or links to the distinguishable MIME part. Each distinguishable MIME part may have a different virtual email generated for the distinguishable MIME part.

FIG. 3 additionally illustrates an example of how distinguishable MIME parts may be processed, including sub-block 302A. As illustrated in FIG. 3, processing distinguishable MIME parts at block 302 may include, at sub-block 302B ("GENERATE VIRTUAL EMAIL"), generating a virtual email for each distinguishable MIME part. Generating each virtual email may include copying header fields of the parent email into the virtual email, where the header fields include a subject field. Generating the virtual email may also include moving a content of the subject field into a different field of the virtual email. The different field to which the content of the subject field is moved may include, e.g., the "X-Original-Subject (new)" field of the virtual email 200 of FIG. 2. More generally, the different field to which the content of the subject field is moved may indicate and/or include the subject of the parent email from which the virtual email is derived and that includes the distinguishable MIME part for which the virtual email is generated. Generating the virtual email may also include saving a filename of the distinguishable MIME part in the subject field of the virtual email. Generating each virtual email may also include saving as a mail body of the virtual email a link to the distinguishable MIME part in the parent email. Block 302 and/or sub-block 302B may be followed by block 303.

At block 303 ("ADD EMAIL AND ANY VIRTUAL EMAILS TO ELECTRONIC MAILBOX"), both the email and each virtual email generated for each distinguishable MIME part of the email may be added to the electronic mailbox of the recipient of the email. Adding the email and each virtual email to the electronic mailbox of the recipient of the email may include adding the email to a first folder of the recipient's electronic mailbox. Alternatively or additionally, adding the email and each virtual email to the electronic mailbox of the recipient of the email may include adding each virtual email to a first parallel namespace or folder of the electronic mailbox that is separate from the first folder and parallel thereto. The first folder may include the inbox within the user's electronic mailbox or some other folder within the user's electronic mailbox. The term "parallel" as used in the "first parallel namespace or folder" indicates that the first parallel namespace or folder is parallel to the first folder, insofar as the first parallel namespace or folder may include only virtual emails for attachments included in emails saved in the first folder.

In some embodiments, the first parallel namespace or folder may be hidden, e.g., may not be visible to some IMAP clients. For instance, the first parallel namespace or folder and more generally all parallel namespaces or folders in which virtual emails are stored may be hidden from some IMAP clients such as OUTLOOK IMAP clients, IPHONE IMAP clients, and/or other IMAP clients, while it may be visible to an AppSuite IMAP client or other IMAP client for use with a DOVECOT IMAP server or other IMAP server. In other embodiments, the parallel namespaces or folders may be visible to all IMAP clients.

Each parallel namespace or folder for virtual emails may be filled as parent emails are received. Alternatively, virtual emails may not be added to their corresponding parallel namespace or folder until the corresponding parallel namespace or folder is opened by a user. In these and other embodiments, if a corresponding parallel namespace or folder is never (or rarely) opened, then its index never (or rarely) has to be updated.

Although not illustrated in FIG. 3, the method of FIG. 3 may include other steps or operations, such as steps or operations for synchronization. For instance, data may be received from an IMAP client that indicates the email was deleted or moved or otherwise processed by the IMAP client without receiving data that indicates the virtual email was deleted or moved or otherwise processed. Such data may include a \Deleted flag or other flag or flags for the email. In response to such data, the virtual email may be synchronized by the IMAP server in a same or similar manner as the parent email even when the data that is received is limited to IMAP client processing of the parent email and not of the virtual email.

As an example, in response to receiving data that indicates the email was deleted at the IMAP client without receiving data that indicates the virtual email was deleted, both the parent email and the virtual email may be expunged. For instance, the parent email and the virtual email may be expunged by moving both the parent email and the virtual email from an inbox folder to a deleted folder of the electronic mailbox.

As another example, in response to receiving data that indicates the parent email was moved from the first folder to a second folder of the electronic mailbox without receiving data that indicates the virtual email was moved, moving the virtual email from the first parallel namespace or folder to a second parallel namespace or folder. In this example, the first parallel namespace or folder may include virtual emails for distinguishable MIME parts of emails stored in the first folder and the second parallel namespace or folder may include virtual emails for distinguishable MIME parts of emails stored in the second folder. Thus, when the parent email is moved from the first folder to the second folder, the virtual email may similarly be moved from one location that is parallel to the first folder (e.g., the first parallel namespace or folder) to another location that is parallel to the second folder (e.g., the second parallel namespace or folder).

The method of FIG. 3 to process MIME messages may include and/or be combined with other methods. For instance, the method of FIG. 3 may further include or be combined with a method or methods to process IMAP commands on a level of MIME attachments. In these and other embodiments, the IMAP server may receive an IMAP command from the IMAP client and may process the IMAP command on the level of MIME attachments (or more generally distinguishable MIME parts). As described above, a virtual email may be generated for each of the MIME attachments by the IMAP server.

As one example, receiving the IMAP command from the IMAP client and processing the IMAP command on the level of MIME attachments may include the IMAP server receiving a FETCH command from the IMAP client for the virtual email and the following additional steps or operations. In response to the FETCH command, the IMAP server may return to the IMAP client the MIME attachment for which the virtual email that is the subject of the FETCH command was generated. The MIME attachment may be returned by the IMAP server to the IMAP client without returning the multipart MIME message or BODYSTRUCTURE of the multipart MIME message to the IMAP client.

The processing of FETCH commands and other IMAP commands on a MIME attachment level according to the embodiments described herein may provide an improvement over IMAP implementations in which MIME attachments are not represented by virtual emails and IMAP commands are not processed on the MIME attachment level. For instance, conventional methods to retrieve a MIME attachment generally require the IMAP client to retrieve the parent email and/or the BODYSTRUCTURE of the parent email before the IMAP client can provide a corresponding MIME attachment to the user. In comparison, embodiments described herein may be at least slightly more efficient by allowing an IMAP client to directly FETCH the MIME attachment without first fetching the parent email and/or the BODYSTRUCTURE of the parent email. In some embodiments, the IMAP client may FETCH BODYSTRUCTURE of the MIME attachment, which may return a piece of the parent email's BODYSTRUCTURE that is specific to the MIME attachment without returning all of the BODYSTRUCTURE of the parent email.

Alternatively or additionally, the user's electronic mailbox—including both emails and virtual emails—may be indexed. Each email and/or virtual email may be indexed in whole or in part. For instance, header fields, mail bodies of CONTENT-TYPE "text", and/or other portions of each email and/or virtual email may be indexed. In these and other embodiments, receiving the IMAP command from the IMAP client and processing the IMAP command on the level of MIME attachments may include the IMAP server receiving a SEARCH, SORT, or THREAD command from the IMAP client and the following additional steps or operations. The indexed electronic mailbox may be searched for messages that match search criteria included in the SEARCH, SORT, or THREAD command. It may be determined that at least some of the virtual emails match the search criteria. The IMAP server may then return data to the IMAP client consistent with the received command. For instance, for a SEARCH command, the IMAP server may return to the IMAP client a list of the virtual emails that match the search criteria in response to the SEARCH command. For a SORT command, the IMAP server may sort the virtual emails that match the search criteria according to sort criteria included in the SORT command to generate a sorted list and may return the sorted list to the IMAP client in response to the SORT command. For a THREAD command, the IMAP server may thread the virtual emails that match the search criteria according to a threading algorithm included in the THREAD command to generate a threaded list and may return the threaded list to the IMAP client in response to the THREAD command.

Thus, according to some embodiments described herein, a SEARCH command can return to the IMAP client which MIME parts specifically match a query, rather than just receiving a reply from the IMAP server that the query matches specific emails without specifying whether the query matches the message text body or one of the attachments of the emails.

Alternatively or additionally, SORT can be implemented according to embodiments described herein to, e.g., sort MIME attachments by their filename. For instance, an IMAP client could do a SORT by Subject. In the virtual email 200 of FIG. 2, the subject of each virtual email that represents each MIME attachment or other MIME part would be the filename. Thus, sorting virtual emails by Subject sorts MIME attachments by filename.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 4:
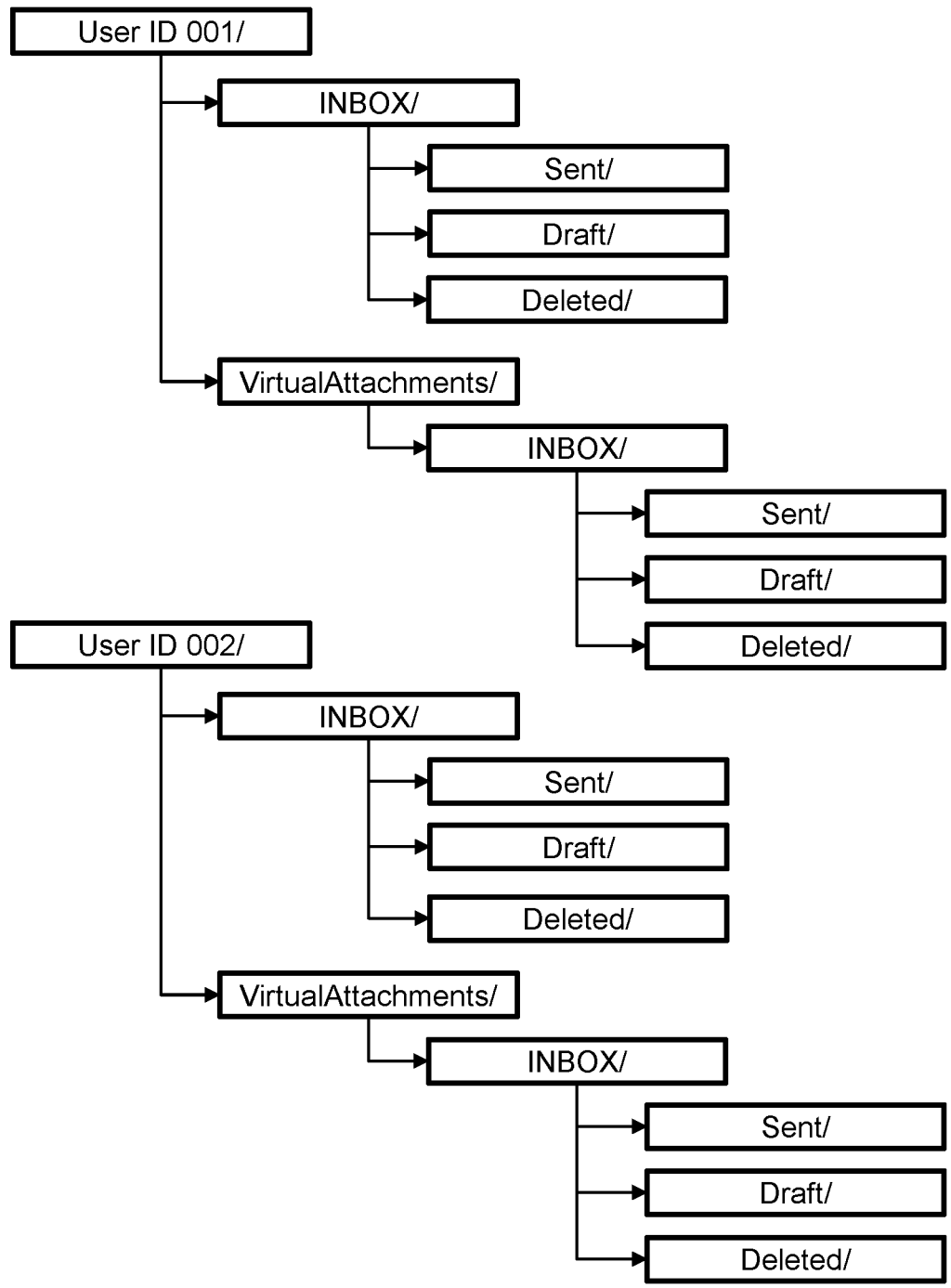
FIG. 4 illustrates an example logical mail folder structure, when virtual emails are processed.

FIG. 4 illustrates an example logical mail folder structure, when virtual emails are processed, arranged in accordance with at least one embodiment described herein. In the example of FIG. 4, each user has an electronic mailbox identified by a user ID (User ID) of the user. For instance, in FIG. 4, two electronic mailboxes are illustrated, one for a first user identified with User ID 001 and another for a second user identified with User ID 002. Similarly, other electronic mailboxes may be provided for other users. Each User ID may have the namespace INBOX, which may contain folders like Sent, or Draft, or others. A namespace such as VirtualAttachments or other suitable namespace may be created as a parallel namespace which reflects the folders from the INBOX and only contains virtual emails, each with the email header fields of the parent email and a link to the related MIME part in the parent email. For example virtual emails in the Sent folder within the INBOX of the VirtualAttachments namespace may include header fields of parent emails and links to the corresponding MIME parts in the Sent folder within the main INBOX namespace.

Figure 5:
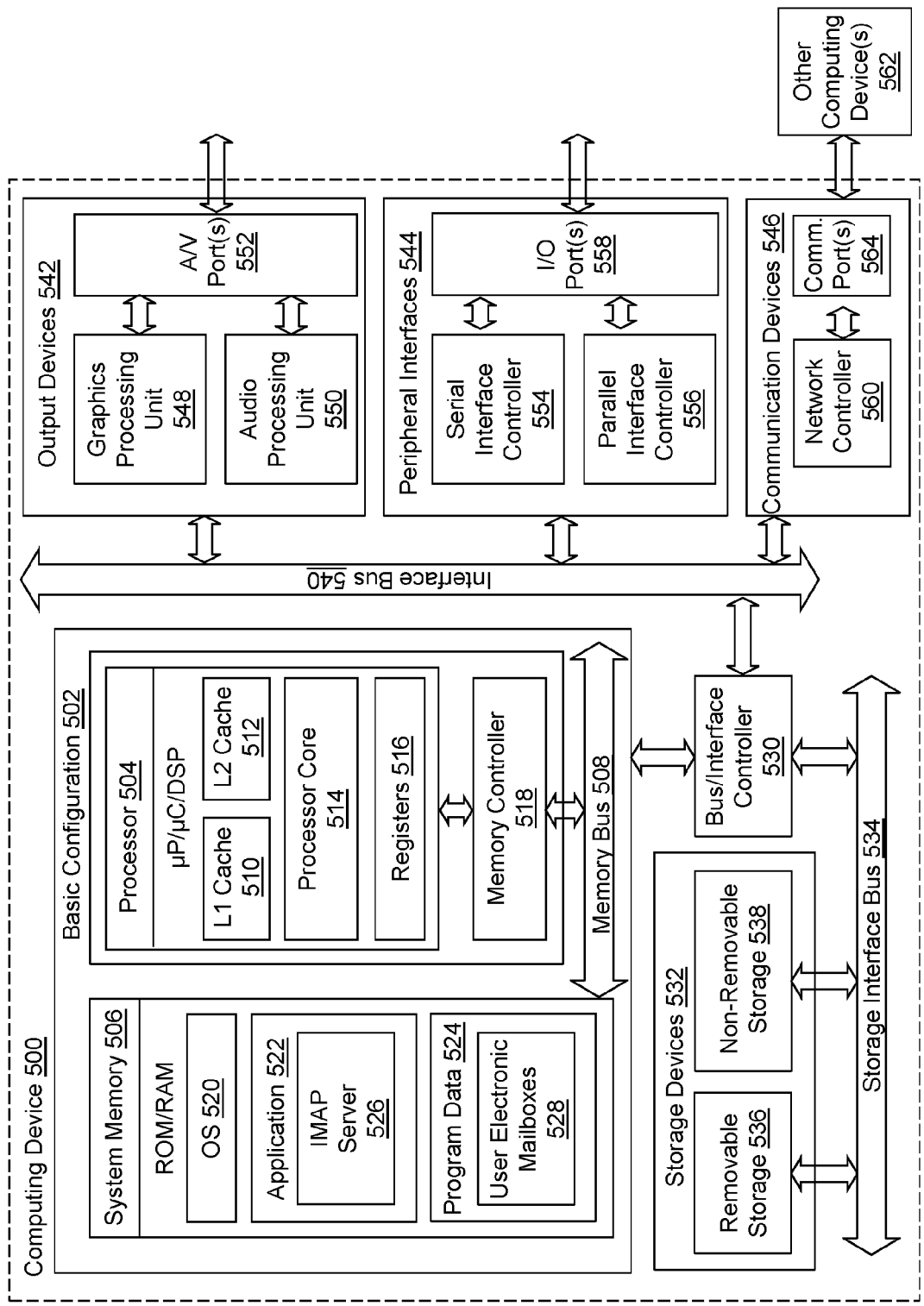
FIG. 5 is a block diagram illustrating an example computing device that is arranged to operate as an IMAP server, all arranged in accordance with at least one embodiment described herein.

FIG. 5 is a block diagram illustrating an example computing device 500 that is arranged to operate as an IMAP server, arranged in accordance with at least one embodiment described herein. In a basic configuration 502, the computing device 500 typically includes one or more processors 504 and a system memory 506. A memory bus 508 may be used to communicate between the processor 504 and the system memory 506.

Depending on the desired configuration, the processor 504 may be of any type including, but not limited to, a microprocessor (µP), a microcontroller (µC), a digital signal processor (DSP), or any combination thereof. The processor 504 may include one or more levels of caching, such as a level one cache 510 and a level two cache 512, a processor core 514, and registers 516. The processor core 514 may include an arithmetic logic unit (ALU), a floating point unit (FPU), a digital signal processing core (DSP Core), or any combination thereof. An example memory controller 518 may also be used with the processor 504, or in some implementations the memory controller 518 may include an internal part of the processor 504.

Depending on the desired configuration, the system memory 506 may be of any type including volatile memory (such as RAM), nonvolatile memory (such as ROM, flash memory, etc.), or any combination thereof. The system memory 506 may include an operating system 520, one or more applications 522, and program data 524. The application 522 may include an IMAP server 526 that is arranged to process MIME messages with MIME attachments as described herein and/or to process IMAP commands on a level of MIME attachments. The program data 524 may include user electronic mailboxes 528 as described herein, or other IMAP data or algorithms. In some embodiments, the application 522 may be arranged to operate with the program data 524 on the operating system 520 such that MIME messages with MIME attachments in the user electronic mailboxes 528 may be processed as described herein and/or IMAP commands may be processed at the level of MIME attachments in the user electronic mailboxes 528 as described herein. In other embodiments, the computing device 500 may be arranged to operate as an IMAP client device, in which case, e.g., the application 522 may include an IMAP client instead of the IMAP server 526.

The computing device 500 may have additional features or functionality, and additional interfaces to facilitate communications between the basic configuration 502 and any involved devices and interfaces. For example, a bus/interface controller 530 may be used to facilitate communications between the basic configuration 502 and one or more data storage devices 532 via a storage interface bus 534. The data storage devices 532 may be removable storage devices 536, non-removable storage devices 538, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer-readable instructions, data structures, program modules, or other data.

The system memory 506, the removable storage devices 536, and the non-removable storage devices 538 are examples of computer storage media or non-transitory computer-readable media. Computer storage media or non-transitory computer-readable media includes RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other non-transitory medium which may be used to store the desired information and which may be accessed by the computing device 500. Any such computer storage media or non-transitory computer-readable media may be part of the computing device 500.

The computing device 500 may also include an interface bus 540 to facilitate communication from various interface devices (e.g., output devices 542, peripheral interfaces 544, and communication devices 546) to the basic configuration 502 via the bus/interface controller 530. The output devices 542 include a graphics processing unit 548 and an audio processing unit 550, which may be configured to communicate to various external devices such as a display or speakers via one or more A/V ports 552. Diagrams, flowcharts, organizational charts, connectors, and/or other graphical objects generated by the diagram application 526 may be output through the graphics processing unit 548 to such a display. The peripheral interfaces 544 include a serial interface controller 554 or a parallel interface controller 556, which may be configured to communicate with external devices such as input devices (e.g., keyboard, mouse, pen, voice input device, touch input device, etc.), sensors, or other peripheral devices (e.g., printer, scanner, etc.) via one or more I/O ports 558. The communication devices 546 include a network controller 560, which may be arranged to facilitate communications with one or more other computing devices 562 over a network communication link via one or more communication ports 564. In embodiments in which the computing device 500 is arranged to operate as an IMAP server, the one or more other computing devices 562 may include one or more IMAP client devices.

The network communication link may be one example of a communication media. Communication media may typically be embodied by computer-readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term "computer-readable media" as used herein may include both storage media and communication media.

The computing device 500 may be implemented as a portion of a small-form factor portable (or mobile) electronic device such as a smartphone, a personal data assistant (PDA) or an application-specific device. The computing device 500 may also be implemented as a personal computer including tablet computer, laptop computer, and/or non-laptop computer configurations, or a server computer including both rack-mounted server computer and blade server computer configurations.

In view of the foregoing, various embodiments that can be implemented independently or together will now be described. In an example embodiment, a method to process multipart MIME messages (such as emails with MIME attachments) is described. The method may include receiving a multipart MIME message. The method may also include determining that the multipart MIME message includes a distinguishable MIME part. The method may also include processing the distinguishable MIME part. Processing the distinguishable MIME part may include generating a virtual email that represents the distinguishable MIME part. The method may also include adding the multipart MIME message and the virtual email to an electronic mailbox of a recipient of the multipart MIME message.

Alternatively or additionally, the method may further include receiving an IMAP command from an IMAP client and processing the IMAP command on a level of MIME attachments of the electronic mailbox, where the distinguishable MIME part includes a given MIME attachment of the MIME attachments. In some embodiments, receiving the IMAP command from the IMAP client and processing the IMAP command on the level of MIME attachments includes receiving a FETCH command from the IMAP client for the virtual email; and in response to the FETCH command, returning the distinguishable MIME part to the IMAP client without returning the multipart MIME message or all BODYSTRUCTURE of the multipart MIME message to the IMAP client, although a piece of the multipart MIME message's BODYSTRUCTURE that is specific to the MIME attachment may be returned.

Alternatively or additionally, the virtual email is a given virtual email. The method further includes indexing the electronic mailbox, including indexing multiple MIME messages that include the multipart MIME message and indexing multiple virtual emails that include the given virtual email. Each of the virtual emails represents a different one of the MIME attachments. Receiving the IMAP command from the IMAP client and processing the IMAP command on the level of MIME attachments includes: receiving a SEARCH command, a SORT command, or a THREAD command from the IMAP client; searching the indexed electronic mailbox for messages that match search criteria included in the SEARCH command, the SORT command, or the THREAD command; determining that at least some of the virtual emails match the search criteria; and one of: returning a list of the at least some of the virtual emails to the IMAP client in response to the SEARCH command; sorting the at least some of the virtual emails according to sort criteria included in the SORT command to generate a sorted list and returning the sorted list to the IMAP client in response to the SORT command; or threading the at least some of the virtual emails according to a threading algorithm included in the THREAD command to generate a threaded list and returning the threaded list to the IMAP client in response to the THREAD command.

Alternatively or additionally, generating the virtual email includes: copying header fields of the multipart MIME message into the virtual email, where the header fields include a subject field; moving a content of the subject field into a different field of the virtual email that indicates a subject of the multipart MIME message from which the virtual email is derived; saving a filename of the distinguishable MIME part in the subject field; and saving as a mail body of the virtual email a link to the distinguishable MIME part in the multipart MIME message.

Alternatively or additionally, determining that the multipart MIME message includes the distinguishable MIME part includes determining that the multipart MIME message includes a MIME part with CONTENT-DISPOSITION that includes "attachment".

Alternatively or additionally, adding the multipart MIME message and the virtual email to the electronic mailbox of the recipient of the multipart MIME message includes: adding the multipart MIME message to a first folder of the electronic mailbox; and adding the virtual email to a first parallel namespace or folder of the electronic mailbox that is separate from the first folder.

Alternatively or additionally, the method further includes: receiving data for the multipart MIME message from an IMAP client that indicates the multipart MIME message was deleted or moved by the IMAP client without receiving data that indicates the virtual email was deleted or moved; in response to receiving data that indicates the multipart MIME message was deleted without receiving data that indicates the virtual email was deleted, expunging both the multipart MIME message and the virtual email; and in response to receiving data that indicates the multipart MIME message was moved from the first folder to a second folder of the electronic mailbox without receiving data that indicates the virtual email was moved, moving the virtual email from the first parallel namespace or folder to a second parallel namespace or folder, where: the first parallel namespace or folder includes virtual emails for distinguishable MIME parts of multipart MIME messages stored in the first folder; and the second parallel namespace or folder includes virtual emails for distinguishable MIME parts of multipart MIME messages stored in the second folder.

Alternatively or additionally, adding the virtual email to the first parallel namespace or folder of the electronic mailbox that is separate from the first folder includes adding the virtual email to a namespace or folder of the electronic mailbox that is not visible to an IMAP client.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable media.

Computer-executable instructions may include, for example, instructions and data which cause a general-purpose computer, special-purpose computer, or special-purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general-purpose hardware), specific hardware implementations or a combination of software and specific hardware implementations are also possible and contemplated. In this description, a "computing entity" may be any computing system as previously defined herein, or any module or combination of modulates running on a computing system.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method to process multipart Multipurpose Internet Mail Extensions (MIME) messages, the method comprising:
   receiving a multipart MIME message;
   determining that the multipart MIME message includes a distinguishable MIME part, including determining that the multipart MIME message includes a MIME part with CONTENT-DISPOSITION that includes "attachment";
   processing the distinguishable MIME part, including generating a virtual email that represents the distinguishable MIME part; and
   adding the multipart MIME message and the virtual email to an electronic mailbox of a recipient of the multipart MIME message,
   wherein generating the virtual email includes:
      copying header fields of the multipart MIME message into the virtual email;
      saving a subject field of the multipart MIME message as a different field in the virtual email that indicates a subject of the multipart MIME message from which the virtual email is derived;
      saving a filename of the distinguishable MIME part in a subject field of the virtual email; and
      saving as a mail body of the virtual email a link to the distinguishable MIME part in the multipart MIME message.

2. The method of claim 1, further comprising receiving an IMAP command from an IMAP client and processing the IMAP command on a level of MIME attachments of the electronic mailbox, wherein the distinguishable MIME part includes a given MIME attachment of the MIME attachments.

3. The method of claim 2, wherein receiving the IMAP command from the IMAP client and processing the IMAP command on the level of MIME attachments includes:
   receiving a FETCH command from the IMAP client for the virtual email; and
   in response to the FETCH command, returning the distinguishable MIME part to the IMAP client.

4. The method of claim 2, wherein:
   the virtual email is a given virtual email;
   the method further comprises indexing the electronic mailbox, including indexing a plurality of MIME messages that includes the multipart MIME message and a plurality of virtual emails that includes the given virtual email;
   each of the plurality of virtual emails represents a different one of the MIME attachments; and
   receiving the IMAP command from the IMAP client and processing the IMAP command on the level of MIME attachments includes:
      receiving a SEARCH command from the IMAP client;
      searching the indexed electronic mailbox for messages that match search criteria included in the SEARCH command;
      determining that the given virtual email matches the search criteria; and
      returning the given virtual email to the IMAP client in response to the SEARCH command.

5. The method of claim 2, wherein:
   the virtual email is a given virtual email;
   the method further comprises indexing the electronic mailbox, including indexing a plurality of MIME messages that includes the multipart MIME message and a plurality of virtual emails that includes the given virtual email;
   each of the plurality of virtual emails represents a different one of the MIME attachments; and
   receiving the IMAP command from the IMAP client and processing the IMAP command on the level of MIME attachments includes:
      receiving a SORT command from the IMAP client;
      searching the indexed electronic mailbox for messages that match search criteria included in the SORT command;
      determining that at least some of the virtual emails match the search criteria;
      sorting the at least some of the virtual emails according to sort criteria included in the SORT command to generate a sorted list; and
      returning the sorted list to the IMAP client in response to the SORT command.

6. The method of claim 2, wherein:
   the virtual email is a given virtual email;
   the method further comprises indexing the electronic mailbox, including indexing a plurality of MIME messages that includes the multipart MIME message and a plurality of virtual emails that includes the given virtual email;
   each of the plurality of virtual emails represents a different one of the MIME attachments; and
   receiving the IMAP command from the IMAP client and processing the IMAP command on the level of MIME attachments includes:
      receiving a THREAD command from the IMAP client;
      searching the indexed electronic mailbox for messages that match search criteria included in the THREAD command;
      determining that at least some of the virtual emails match the search criteria;
      threading the at least some of the virtual emails according to a threading algorithm included in the THREAD command to generate a threaded list; and
      returning the threaded list to the IMAP client in response to the THREAD command.

7. The method of claim 1, wherein adding the multipart MIME message and the virtual email to the electronic mailbox of the recipient of the multipart MIME message includes:
  adding the multipart MIME message to a first folder of the electronic mailbox; and
  adding the virtual email to a first parallel namespace or folder of the electronic mailbox that is separate from the first folder.

8. The method of claim 7, further comprising:
  receiving data for the multipart MIME message from an IMAP client that indicates the multipart MIME message was deleted or moved by the IMAP client without receiving data that indicates the virtual email was deleted or moved;
  in response to receiving data that indicates the multipart MIME message was deleted without receiving data that indicates the virtual email was deleted, expunging both the multipart MIME message and the virtual email; and
  in response to receiving data that indicates the multipart MIME message was moved from the first folder to a second folder of the electronic mailbox without receiving data that indicates the virtual email was moved, moving the virtual email from the first parallel namespace or folder to a second parallel namespace or folder, wherein:
    the first parallel namespace or folder includes virtual emails for distinguishable MIME parts of multipart MIME messages stored in the first folder; and
    the second parallel namespace or folder includes virtual emails for distinguishable MIME parts of multipart MIME messages stored in the second folder.

9. The method of claim 7, wherein adding the virtual email to the first parallel namespace or folder of the electronic mailbox that is separate from the first folder includes adding the virtual email to a namespace or folder of the electronic mailbox that is not visible to an IMAP client.

10. A non-transitory computer-readable medium having computer-readable instructions stored thereon that are executable by a processing device to perform or control performance of operations comprising:
  receiving a multipart Multipurpose Internet Mail Extensions (MIME) message;
  determining that the multipart MIME message includes a distinguishable MIME part, including that the multipart MIME message includes a MIME part with CONTENT-DISPOSITION that includes "attachment";
  processing the distinguishable MIME part, including generating a virtual email that represents the distinguishable MIME part; and
  adding the multipart MIME message and the virtual email to an electronic mailbox of a recipient of the multipart MIME message;
  wherein generating the virtual email includes:
    copying header fields of the multipart MIME message into the virtual email;
    saving a subject field of the multipart MIME message as a different field in the virtual email that indicates a subject of the multipart MIME message from which the virtual email is derived;
    saving a filename of the distinguishable MIME part in a subject field of the virtual email; and
    saving as a mail body of the virtual email a link to the distinguishable MIME part in the multipart MIME message.

11. The non-transitory computer-readable medium of claim 10, further comprising receiving an IMAP command from an IMAP client and processing the IMAP command on a level of MIME attachments of the electronic mailbox, wherein the distinguishable MIME part includes a given MIME attachment of the MIME attachments.

12. The non-transitory computer-readable medium of claim 11, wherein receiving the IMAP command from the IMAP client and processing the IMAP command on the level of MIME attachments includes:
  receiving a FETCH command from the IMAP client for the virtual email; and
  in response to the FETCH command, returning the distinguishable MIME part to the IMAP client.

13. The non-transitory computer-readable medium of claim 11, wherein:
  the virtual email is a given virtual email;
  the operations further comprise indexing the electronic mailbox, including indexing a plurality of MIME messages that includes the multipart MIME message and a plurality of virtual emails that includes the given virtual email;
  each of the plurality of virtual emails represents a different one of the MIME attachments; and
  receiving the IMAP command from the IMAP client and processing the IMAP command on the level of MIME attachments includes:
    receiving a SEARCH command, a SORT command, or a THREAD command from the IMAP client;
    searching the indexed electronic mailbox for messages that match search criteria included in the SEARCH command, the SORT command, or the THREAD command;
    determining that at least some of the virtual emails match the search criteria; and one of:
      returning a list of the at least some of the virtual emails to the IMAP client in response to the SEARCH command;
      sorting the at least some of the virtual emails according to sort criteria included in the SORT command to generate a sorted list and returning the sorted list to the IMAP client in response to the SORT command; or
      threading the at least some of the virtual emails according to a threading algorithm included in the THREAD command to generate a threaded list and returning the threaded list to the IMAP client in response to the THREAD command.

14. The non-transitory computer-readable medium of claim 10, wherein adding the multipart MIME message and the virtual email to the electronic mailbox of the recipient of the multipart MIME message includes:
  adding the multipart MIME message to a first folder of the electronic mailbox; and
  adding the virtual email to a first parallel namespace or folder of the electronic mailbox that is separate from the first folder.

15. The non-transitory computer-readable medium of claim 14, the operations further comprising:
  receiving data for the multipart MIME message from an IMAP client that indicates the multipart MIME message was deleted or moved by the IMAP client without receiving data that indicates the virtual email was deleted or moved;
  in response to receiving data that indicates the multipart MIME message was deleted without receiving data that indicates the virtual email was deleted, expunging both the multipart MIME message and the virtual email; and in response to receiving data that indicates the multipart MIME message was moved from the first folder to a second folder of the electronic mailbox without receiving data that indicates the virtual email was moved, moving the virtual email from the first parallel namespace or folder to a second parallel namespace or folder, wherein:

the first parallel namespace or folder includes virtual emails for distinguishable MIME parts of multipart MIME messages stored in the first folder; and the second parallel namespace or folder includes virtual emails for distinguishable MIME parts of multipart MIME messages stored in the second folder.

16. The non-transitory computer-readable medium of claim 14, wherein adding the virtual email to the first parallel namespace or folder of the electronic mailbox that is separate from the first folder includes adding the virtual email to a namespace or folder of the electronic mailbox that is not visible to an IMAP client.

17. A method to process multipart Multipurpose Internet Mail Extensions (MIME) messages, the method comprising:
receiving a multipart MIME message;
determining that the multipart MIME message includes a distinguishable MIME part, including determining that the multipart MIME message includes a MIME part with CONTENT-DISPOSITION that includes "attachment";
processing the distinguishable MIME part, including generating a virtual email that represents the distinguishable MIME part, the virtual email including header fields and a mail body, wherein the header fields of the virtual email include header fields of the multipart MIME message and a subject field that includes a filename of the distinguishable MIME part and wherein the mail body of the virtual email includes a link to the distinguishable MIME part in the multipart MIME message; and
adding the multipart MIME message and the virtual email to an electronic mailbox of a recipient of the multipart MIME message.

18. The method of claim 17, further comprising receiving an IMAP command from an IMAP client and processing the IMAP command on a level of MIME attachments of the electronic mailbox, wherein the distinguishable MIME part includes a given MIME attachment of the MIME attachments.

19. The method of claim 18, wherein receiving the IMAP command from the IMAP client and processing the IMAP command on the level of MIME attachments includes:
receiving a FETCH command from the IMAP client for the virtual email; and
in response to the FETCH command, returning the distinguishable MIME part to the IMAP client.

20. The method of claim 18, wherein:
the virtual email is a given virtual email;
the method further comprises indexing the electronic mailbox, including indexing a plurality of MIME messages that includes the multipart MIME message and a plurality of virtual emails that includes the given virtual email;
each of the plurality of virtual emails represents a different one of the MIME attachments; and
receiving the IMAP command from the IMAP client and processing the IMAP command on the level of MIME attachments includes:
receiving a SEARCH command, a SORT command, or a THREAD command from the IMAP client;
searching the indexed electronic mailbox for messages that match search criteria included in the SEARCH command, the SORT command, or the THREAD command;
determining that at least some of the virtual emails match the search criteria; and one of:
returning a list of the at least some of the virtual emails to the IMAP client in response to the SEARCH command;
sorting the at least some of the virtual emails according to sort criteria included in the SORT command to generate a sorted list and returning the sorted list to the IMAP client in response to the SORT command; or
threading the at least some of the virtual emails according to a threading algorithm included in the THREAD command to generate a threaded list and returning the threaded list to the IMAP client in response to the THREAD command.

* * * * *